United States Patent Office 3,625,731
Patented Dec. 7, 1971

3,625,731
STAINING PLASTIC SURFACES
Lynn J. Taylor, Haslett, Mich., assignor to
Owens-Illinois, Inc.
No Drawing. Filed Nov. 12, 1968, Ser. No. 775,127
Int. Cl. B44d 1/24
U.S. Cl. 117—38                                9 Claims

ABSTRACT OF THE DISCLOSURE

Plastic articles are provided with sub-surface markings which are scuff-proof and resistant to acid, alkali and solvent attack; a staining composition which includes a penetrating dye and a carrier medium comprised of a water-soluble or water-dispersible resin or polymer is applied to a plastic surface in a desired pattern, the surface and staining composition are then suitably processed to effectuate at least a partial diffusion of the dye beneath the surface and the residual composition is removed from the surface by treatment with water or an aqueous medium, thereby resulting in a durable and resistant sub-surface pattern.

THE INVENTION

The invention relates to the permanent marking, printing or decorating of polymeric surfaces. More particularly, it relates to the formation of sub-surface markings on polymeric substrates, including articles such as beakers and container items, which are scuff-proof and highly resistant to chemical attack, e.g., by caustic, hydrochloric acid and sulfuric acid.

Untreated polyolefins, and other polymers produced from monomers having monoethylenically unsaturated bonding, will not permit conventional ink coatings to adhere thereto. Standard type inks, e.g., gravure, silk screen, flexographic and dry offset inks, when applied to these type surfaces and dried or cured in accordance with the normal schedule for any particular ink or coating, are easily removed therefrom by a slight scraping action. Another drawback of these compositions, which is especially acute in the marking of plastic laboratory ware such as, for example, beakers, flasks and pipets, is that they are subject to attack by solutions of acid, alkali, or solvents.

In recent years much has been done in this field to develop techniques for improving the adherence of inks, markings and coatings to polymeric materials. These efforts have been primarily restricted to various surface treatment procedures such as applying an oxidizing solution of sodium dichromate and sulfuric acid to the polymer surface or flame treating the surface prior to ink application. While somewhat successful, these techniques still result in markings or prints which can be chemically removed or physically removed by scraping because the final marking is typically raised, or projects upwardly of the polymer surface, thereby making it highly susceptible to abrasion and/or chemical attack. Additionally, these treatments tend to change the properties of the polymeric materials and make them more reactive with alkalies and acids. Those skilled in the art readily appreciate that the necessity of a pretreatment substantially increases the cost of manufacturing marked polymeric materials.

Still more recently, techniques have been developed for penetrating the polymeric surface during marking. U.S. Pats. Nos. 3,057,098 and 3,290,166, respectively, disclose these techniques. In the former patent the polymeric surface is penetrated by a puncturing or scoring step, the marking composition then being applied to the resulting recesses. It will be appreciated, especially in the case where arcuate surfaces are involved, that this approach is impractical in the manufacture of container items because of the precision and care which is required to guard against forming a puncture which is coextensive with the thickness of the container wall. The latter patent relates to colored low molecular weight polyolefin marking compositions. Here the composition is applied to the substrate and, after a heating step, the composition per se partially penetrates the substrate surface. This technique results in a marking which can be scraped off with a knife blade.

This invention distinguishes over the prior art in that it is directed to a plastic surface marking which is disposed entirely beneath and within the surface of the article which is so marked. The marking cannot be removed by abrasion or scraping without destroying the surface to which it is appendant. Moreover, because of the sub-surface nature of the marking, it is highly resistant to attack by caustic, sulfuric acid, hydrochloric acid and other solvents. The durable and resistant sub-surface mark, print, or decoration which is provided by this invention is obtainable without the use of any pretreatment step and the resulting surface will be uniform, showing no signs of the surface having been punctured or scored.

In order to obtain the improved, marked plastic surfaces as contemplated herein, a staining composition comprising a surface penetrating dye or organic colorant and a water soluble or water dispersible carrier for the dye is applied in a desired pattern onto a plastic substrate; the substrate is then heated for a sufficient time to allow a substantial portion of the colorant to diffuse and penetrate beneath the surface. The residual composition is then removed from the substrate surface by washing or treating with water, steam, or other suitable aqueous mediums such as, for example, acid solutions, basic solutions, or soap or detergent solutions.

The staining composition may be applied by letterpress, gravure, silk-screen, offset or other like conventional printing technique, and is advantageously practiced by applying the colorant as a solution or dispersion in a suitable carrier medium. The carrier medium itself will generally comprise a water-soluble or water-dispersible resin or polymer and a suitable solvent. The medium per se need not, however, and preferably is not of the type which penetrates the plastic substrate. Additionally, suitable conventional adjuvants may be added to the staining composition. The adjuvants employed, such as anti-foaming agents and thickening agents, will be readily selected by those skilled in the art. They are used to adjust the consistency, tack, or viscosity of the marking composition to that required for the specific printing or marking technique being employed.

Plastic materials which may be decorated and marked in accordance with the teachings of this invention include the polycarbonates, polyolefins, and those plastics manufactured from monoethylenically unsaturated monomers such as, for example, vinyl polymers and polystyrene. Thus, suitable decorable plastics in general include polymers and copolymers of the following monomers: ethylene, propylene, butene-1, pentene-1, hexene-1, 3 methyl butene-1, 4 methyl pentene-1, 5 methyl hexene-1, styrene, vinyl chloride and vinyl acetate.

One feature of this invention resides in utilizing an organic colorant which, itself, penetrates the surface of a decorable plastic article and diffuses into its structure. Organic colorants suitable for the practice of this invention are those compounds known in the printing and decorating arts as dyes. It will, of course, be readily apparent that the specific dye employed will depend upon the requirements of the article manufactured. For a comprehensive list of available dyes, reference may be made to The Chemistry of Synthetic Dyes and Pigments, by H. A. Lubs, Reinhold Publishing Corporation, 1955. Representative classes of dyes include acid, basic, spirit oil, vat and disperse dyes. Table I represents a partial summary of commercially available diffusable dyes suitable for the practice of this invention.

water per se, that is, liquid or steam, as well as aqueous mediums such as acidic, basic or soap solutions.

The specific vehicle employed will, of course, depend upon the carrier composition and may be selected from a wide class of solvents or dispersants, including both aromatic and aliphatic organic materials. A suitable vehi-

TABLE I

| | | | |
|---|---|---|---|
| Interchemical Corp. | Yellow G. Base | Disperse Yellow 3 | C.I. 1803 |
| Color and Chemical Div. | Blue N.S.P. Base | Disperse Blue 1 | C.I. 1709 |
| | Red R.N. Base | Disperse Red 17 | C.I. 1305 |
| | Sudan Red MR | | |
| | Celliton Fast Blue AF | | C.I. 61115 |
| General Aniline & Film Corp. | Resoform Red BN | | C.I. 60710 |
| | Sudan Green 4B | | C.I. 60710 |
| | Azosol Brilliant Solvent Yellow 43 | | |
| | Yellow 8 GF | | |
| E.I. du Pont de Nemours & Co., Inc. | Rhodamine B Base | | |
| | Fluid Blue 8 | | |
| | Fluid Green 1 | | |
| | Fluid Black 1 | | |
| Patent Chemicals Co. | Fluid Red G | | |
| | Fluid Red 29 | | |
| | Fluid Bronze 1 | | |
| | Fluid Yellow 8 | | |
| National Aniline Div. of Allied Chemical Co. | Plasto Blue RDA | | |

As priorly noted, this invention is advantageously practiced by applying the dye as a solution or dispersion in a suitable carrier medium. The carrier medium will, in general, include a carrier or binder and a vehicle for the carrier or binder. The carrier itself is a hydrophilic, polymeric, or resinous material. As used herein, the term "hydrophilic material" comprehends those materials which are either water-soluble or those whose adhesion to another surface, for example, the plastic surface which is to be marked or stained, can be destroyed or substantially minimized by contact with water or other aqueous mediums. Thus, water-dispersible materials are also included in the term "hydrophilic material." Those hydrophilic materials which may advantageously be employed as a carrier in the practice of this invention will typically contain water sensitive groups, such as, for example, hydroxyl, carboxyl, carboxylate, sulfonate, ether, amine or ammonium groups. As representative of the class of materials which may be employed, the following may be cited: polyvinylpyrrolidone, polyvinyl alcohol, polyethylene oxide, polypropylene oxide, copolymers of ethylene oxide and propylene oxide, polyethyleneimine, poly(methyl vinyl ether), polyformaldehyde, polyvinylpyridines, sodium-carboxy-methyl cellulose, hydroxyethyl cellulose, hydroxypropyl cellulose, polyacrylamide, polyvinyl acetate, acrylic polymers and copolymers, copolymers of methyl vinyl ether and maleic anhydride, copolymers of ethylene and maleic anhydride and of styrene and maleic anhydride, all of which are commercially available hydrophilic materials. Other materials which may be employed include ethylene-vinyl alcohol copolymers, vinyl acetate-vinyl alcohol copolymers, ethylene-acrylic acid copolymers and polyvinyl formal. The vehicle for the above carriers may be water, or an organic solvent or dispersant; preferably, the vehicle is a relatively volatile organic solvent.

As will be subsequently described, after the staining composition is applied to the surface of a decorable plastic article, the article is preferably heated to a temperature range of about 150–310° F. for about 2–35 minutes. During this heating cycle, at least a portion of the dye penetrates and diffuses into the plastic and the vehicle will, at least when an organic solvent is employed, be substantially volatilized. The residual staining composition remaining on the surface of the plastic substrate will then, in general, include that portion of the dye which has not diffused along with the carrier and any adjuvants which may have been added to the staining composition, as well as any vehicle which may not have been volatilized. Since the carrier will at this point function as a binder, the entire residue may be removed by washing, wiping, treating or brushing the decorated article in the presence of water. As used herein, the term "water" is intended to include cle for polyvinylpyrrolidine may be selected from any of the following organic compounds: methanol, ethanol, propanol, butanol, amyl alcohol, 2 ethyl-1-hexanol, cyclohexanol, phenol, ethylene glycol, propylene glycol, 1,3 butanediol, glycerin, diacetone alcohol, triethylene glycol, ethyl lactate, methylcyclohexanone, methylene dichloride, ethylene dichloride, 2-pyrrolidone, N-methyl-2-pyrrolidone, N-vinyl-2-pyrrolidone, butylamine, aniline, ethylenediamine, pyridine, 2 aminoethanol, triethanolamine, aminoethylethanolamine, 2 amino-2-methyl-1-propanol, nitromethane and nitroethane. It is, of course, understood that other vehicles may also be employed and that the foregoing compounds are merely exemplary. The preferred vehicle for polyvinyl pyrrolidone is a lower aliphatic alcohol such as, for example, n-butanol. Those skilled in the art will readily select a suitable organic vehicle for other hydrophilic carriers. Formamide, dimethylformamide and glycols may be used as the vehicle for polyvinyl alcohol while alcohols, alcohol-benzene mixtures, esters or acetone are suitable vehicles for sodium carboxymethyl cellulose. Polyethyleneimines or poly(methyl vinyl ether) may be used with an alcohol vehicle such as ethanol or propanol. Likewise, when the carrier comprises a copolymer of maleic anhydride and methyl vinyl ether or ethylene, or a copolymer of maleic anhydride and styrene, alcohols are also suitable vehicles.

In accordance with the specific practice of this invention, the staining composition is prepared by appropriately mixing or otherwise physically combining the dye, the vehicle and the hydrophilic carrier. This composition is then applied to a decorable plastic surface by any suitable means, for example, silk-screen printing; the marked surface is then heated for a sufficent time to obtain the desired depth of dye diffusion into the plastic. The intensity and duration of the heating step will generally be dependent upon the article involved; however, it is typically sufficient to heat the decorated article to a temperature range of about 150–310° F. for about 2–35 minutes. After the heating cycle is completed, the residual material remaining above the plastic surface is removed with water, thus leaving a marking on the article which is entirely disposed beneath the surface. In the preferred practice of this invention, the residual super-surface material is removed by washing the decorated area with hot water. This may be done by either wiping or brushing the decorated area with water or by immersing the decorated article in a supply of hot water. Optionally, the residual super-surface composition may be removed by employing a source of pressurized steam which impinges upon the decorated area.

In general, as noted hereinbefore, a broad class of dyes may be employed in the practice of this invention. Representative classes include monoazo, diazo, azoic, acridine, azine, ketone imine, methene, nitro, nitroso, oxazine, quinoline, xanthene and anthroquinone. Because of the numerous dyes which are available, it would be highly impractical to set forth a comprehensive list. Furthermore, since the practice of this invention has wide utility, the desired decoration may have different requirements, that is, in one case only a faint or soft sub-surface marking may be desired, whereas in a different application a highly intense decoration may be required. Since the mechanism of dye diffusion into the polymer is not fully understood, some experimentation will be required in order to determine the optimum method conditions for a specific application. This can be done by simply placing the dye on the plastic to be decorated, heating the plastic and dye and then removing any residual dye from the surface. Those skilled in the art will readily adjust the method to their specific requirements by visually observing the intensity of the resultant, sub-surface marking. However, in order to aid those skilled in the art to duplicate this invention, a list of acceptable diffusable dyes is set forth in Table I; it will, of course, be apparent that these dyes are merely exemplary and are not to be taken as limiting the scope of this invention. As examples of similarly acceptable diffusable dyes may be cited Rhodamine B, Pyronine G, Saccharein, Rhodamine S, Rhodamine 5G, 1, 4 dialkylamineanthraquinone wherein the alkyl is hydrogen or a lower alkyl group having up to 9 carbon atoms, halogenated anthraquinones, such as 1, 4, 5, 8 tetrachloroanthraquinone, 1, 4 dialkylamine-2, 3 dichloroanthraquinone, wherein the alkyl groups are a lower alkyl or hydrogen, 3 amino-1, 3 dibromoanthraquinone, 1 bromo-4-hydroxyanthraquinone and other substituted anthraquinone dyes.

The herinafter examples represent some of the best modes contemplated by the inventor in the practice of this invention.

EXAMPLE I

A staining composition may be prepared using the following procedure. To about 54 ml. of n-butanol which has been heated to a temperature of 70–90° C. is added about 10 grams of polyvinylpyrrolidone with vigorous agitation. A suitable polyvinylpyrrolidone is obtainable from the General Aniline and Film Corporation under their product name PVP K–90. This material is an off-white powder having a molecular weight of 360,000. After the polyvinyl pyrrolidone has substantially gone into solution, about 0.1 gram of a dye is added to the carrier medium with vigorous agitation. A suitable dye is a 1, 4 dialkylamine anthraquinone such as that commercially manufactured and supplied by the National Aniline Division of Allied Chemical Company under the name "Plasto Blue RDA." The mixture is then agitated for several minutes to produce a uniform, homogeneous mass, at which time the staining composition may be applied to the substrate in any conventional manner, for example by using a rubber stamp. Thus, the stamp is partially immersed in the staining composition and a polyethylene substrate is contacted with the stamp whereby the substrate will now bear the pattern corresponding to that of the stamp. The dye is then diffused into the polyethylene substrate by heating same to a temperature range of about 100° C. to 110° C. for a period of 20 minutes. The residual composition remaining upon the substrate surface will generally be in the form of a film and, because of the hydrophilic nature of the carrier, is readily removable by contact and washing with water. To facilitate the film removal, it is generally preferable to employ hot water, for example, at a temperature of 60–70° C. After the removal of the residual super-surface material, there then will remain a sub-surface dye decoration or marking which cannot be removed by vigorous scraping with a knife blade.

The sub-surface decoration is also highly resistant to acid and alkali treatment when tested in accordance with Federal Specification NNN–F–240a. According to this treatment, decorated plastic substrates are immersed in sodium hydroxide, hydrochloric of the decoration. The decorated substrate is completely immersed in 1 N sodium hydroxide solution at room temperature, covered, and boiled for one-half hour. The substrate is then allowed to remain in the alkali for an additional one hour. After removal from the solution, no substantial deterioration of the sub-surface marking is discernible. Another substrate is similarly immersed in concentrated hydrochloric acid (specific gravity 1.18); after remaining in the hydrochloric acid for one and one-half hours subsequent to boiling, no marking deterioration will be noted. Another substrate is allowed to remain completely immersed in concentrated sulfuric acid (specific gravity 1.84) at room temperature for one hour. Again, no deterioration of the sub-surface marking will be discernible.

EXAMPLE II

A staining composition capable of being applied by conventional silk-screen decorating techniques may be prepared using substantially the identical proportions of the ingredients set forth in Example I. Here, however, room temperature n-butanol is employed. Thus, the polyvinylpyrrolidine is added with vigorous mixing and agitation to the n-butanol, the agitation being continued until a homogeneous mass is obtained. This may, for example, be done in a Waring blendor. The dye is then added and mixing continued until the dye is uniformly dispersed throughout the carrier medium. By means of a conventional silk-screen decorating technique, the staining composition is applied to a polypropylene beaker and the dye is diffused into the beaker by heating same to a temperature of about 120° C. for a period of 10 minutes. After removing the residual staining composition by washing the beaker with hot tap water, there remains a sub-surface dye image in the beaker which has the same beneficial characteristics noted in Example 1.

It will, of course, be apparent that the above examples are merely exemplary and not limiting and that the staining composition may be varied to suit the particular requirements of the decorating or marking technique being employed. For example, those skilled in the art will readily select suitable adjuvants which may be added to the composition for purposes of obtaining desired flow characteristics. Typically, these adjuvants will be either small particulate silica or a suitable bentonite clay composition. Consequently, the true scope of this invention is as described in the following claims.

I claim:
1. A method for permanently marking a plastic selected from polycarbonate, polyolefins, polystyrene, or vinyl polymers which comprises the steps of:
    (1) applying a staining composition consisting essentially of a mixture of a plastic-surface penetrating dye, a polyvinylpyrrolidone resin and butanol onto the surface of said plastic
    (2) heating said surface to a temperature of about 150–310° F. for a time sufficient to allow at least a portion of said dye to penetrate and diffuse into said surface
    (3) removing the residual composition on said surface with the use of water.

2. The method of claim 1 wherein said dye is a 1, 4 dialkylamineanthraquinone wherein the alkyl group is hydrogen or an alkyl having up to nine carbon atoms.

3. The method of claim 1 wherein said dye is Rhodamine B.

4. The method of claim 2 wherein said butanol, said dye, and said polyvinylpyrrolidone are present in the proportions of about 54 ml. of said butanol, about 10 grams of polyvinylpyrrolidone and about 0.1 gram of said dye.

5. The method of claim 4, wherein said composition further includes an effective consistency adjusting amount of particulate silica or bentonite clay.

6. A method for permanently marking a decorable plastic article wherein said plastic is selected from polycarbonate or a polymer or copolymer of a monoethylenically unsaturated monomer comprising the steps of
(1) applying a staining composition onto the surface of said plastic, said staining composition consisting essentially of:
  (A) a plastic-surface penetrating dye
  (B) a hydrophilic carrier and
  (C) a vehicle for said hydrophilic carrier, said hydrophilic carrier being a member selected from the group consisting of polyvinylpyrrolidone, polyvinyl alcohol, polyethylene oxide, polypropylene oxide, copolymers of ethylene oxide and propylene oxide, polyethylene imine, poly (methyl vinyl ether), polyformaldehyde, polyvinylpyridine, sodiumcarboxymethyl cellulose, hydroxyethyl cellulose, hydroxy propyl cellulose, polyacrylamide, polyvinyl acetate, copolymers of methyl vinyl ether and maleic anhydride, copolymers of ethylene and maleic anhydride, ethylenevinyl alcohol copolymers, vinyl acetate-vinyl alcohol copolymers, ethylene-acrylic acid copolymers and polyvinyl formal
(2) heating said surface for a time sufficient to diffuse at least a portion of said dye into said surface and
(3) removing the residual composition from the surface with water.

7. The method of claim 6 wherein said vehicle is water.

8. The method of claim 6 wherein said vehicle is an organic solvent which substantially volatilizes when heated to a temperature range of about 150–310° F. for about 2–35 minutes and wherein the dye diffusion of step 2 is effected by heating to a temperature range of about 150–310° F. for about 2–35 minutes.

9. The method of claim 8 wherein said hydrophilic carrier is polyvinylpyrrolidone or poly(methyl vinyl ether) and wherein said dye is 1, 4 dialkylamineanthraquinone wherein the alkyl is hydrogen or a lower alkyl having up to nine carbon atoms.

References Cited

UNITED STATES PATENTS

| | | | |
|---|---|---|---|
| 2,915,416 | 12/1959 | West | 106—32 X |
| 3,016,308 | 1/1962 | Macaulay | 106—22 UX |
| 3,043,784 | 7/1962 | Remer | 106—20 X |
| 3,425,779 | 2/1969 | Fisher et al. | 106—22 X |
| 3,502,495 | 3/1970 | Akamatsu | 106—22 X |
| 3,519,466 | 7/1970 | Akamatsu | 117—38 |

FOREIGN PATENTS

| | | | |
|---|---|---|---|
| 1,064,663 | 9/1959 | Germany | 106—22 |
| 614,595 | 12/1960 | Italy | 117—38 |

ALFRED L. LEAVITT, Primary Examiner

J. R. BATTEN, Jr., Assistant Examiner

U.S. Cl. X.R.

8—4; 106—22; 117—102 R

PO-1050
(5/69)

UNITED STATES PATENT OFFICE
CERTIFICATE OF CORRECTION

Patent No. 3,625,731        Dated December 7, 1971

Inventor(s) Lynn J. Taylor

It is certified that error appears in the above-identified patent and that said Letters Patent are hereby corrected as shown below:

Column 3, Table I, column 2, line 3, remove the parentheses.
Column 5, line 75, after "hydrochloric" insert - - acid and sulfuric acid in order to test the solvent resistance - - .
Column 6, line 25, "blendor" should be - - blender - - .

Signed and sealed this 2nd day of May 1972.

(SEAL)
Attest:

EDWARD M. FLETCHER, JR.
Attesting Officer

ROBERT GOTTSCHALK
Commissioner of Patents